US012424921B2

(12) United States Patent
Chen

(10) Patent No.: US 12,424,921 B2
(45) Date of Patent: Sep. 23, 2025

(54) POWER SUPPLY CONTROLLER CIRCUIT FOR EFFECTIVELY SAVING POWER UNDER ELECTRICAL SPECIFICATION

(71) Applicant: ANPEC ELECTRONICS CORPORATION, Hsinchu (TW)

(72) Inventor: Fu-Chuan Chen, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 208 days.

(21) Appl. No.: 18/518,453

(22) Filed: Nov. 23, 2023

(65) Prior Publication Data

US 2025/0096666 A1    Mar. 20, 2025

(30) Foreign Application Priority Data

Sep. 15, 2023   (TW) .................................. 112135209

(51) Int. Cl.
*H02M 1/00*    (2007.01)
*H02M 1/32*    (2007.01)

(52) U.S. Cl.
CPC ....... *H02M 1/0032* (2021.05); *H02M 1/0006* (2021.05); *H02M 1/32* (2013.01)

(58) Field of Classification Search
CPC ..... H02M 1/0032; H02M 1/0006; H02M 1/32
See application file for complete search history.

(56) References Cited

U.S. PATENT DOCUMENTS

2020/0303946 A1 * 9/2020 Sung ....................... H02J 9/005
2023/0318511 A1 * 10/2023 Cerutti .................. H02M 3/158
                                                                      318/445

* cited by examiner

*Primary Examiner* — Rafael O De Leon Domenech
(74) *Attorney, Agent, or Firm* — Li & Cai Intellectual Property Office

(57) ABSTRACT

A power supply controller circuit for effectively saving power under an electrical specification is provided. First terminals of a capacitor and a third switch component are connected to a first terminal of a power supply device. First terminals of first and second switch components are connected to a second terminal of the capacitor. Second terminals of the first and second switch components are connected to a second terminal of the power supply device. A first terminal of a fourth switch component is connected to a second terminal of the third switch component. A control circuit controls operations of the first to third switch components and a driver circuit drives the fourth switch component in the power supply controller circuit, such that a current flowing through the power supply controller circuit to the second terminal of the power supply device is not smaller than a current threshold.

19 Claims, 14 Drawing Sheets

POWER SUPPLY CONTROLLER CIRCUIT FOR EFFECTIVELY SAVING POWER UNDER ELECTRICAL SPECIFICATION

CROSS-REFERENCE TO RELATED PATENT APPLICATION

This application claims the benefit of priority to Taiwan Patent Application No. 112135209, filed on Sep. 15, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power supply controller circuit, and more particularly to a power supply controller circuit for effectively saving power under an electrical specification.

BACKGROUND OF THE DISCLOSURE

With the development of science and technology in recent years, functions of electronic devices are continuously developed, which causes an increase in power consumption of the electronic devices. Therefore, amounts of power supplied by power converters, and efficiencies that power converters convert power from the power supply devices and supply the converted power to the electronic devices must be improved.

When the power supply device supplies the power to the power converter, a system detects a current flowing back to the power supply device, and determines whether the current flowing back to the power supply device is larger than a current threshold to determine whether the power supply device is connected to the power converter. If a length of time during which the current flowing back to the power supply device is smaller than the current threshold exceeds a specified length of time that is specified in the electrical specification, the system determines that the power converter is removed and instructs the power supply device to stop supplying the current. As a result, the power supply device does not continually supply power to the electronic device, which causes reduction in an operating efficiency of the electronic device.

Therefore, when the current flowing back to the power supply device is smaller than the current threshold, the power supply device must supply more current such that the current flowing back to the power supply device is increased to reach the current threshold specified in the electrical specification within the specified time, which causes additional power consumption.

SUMMARY OF THE DISCLOSURE

In response to the above-referenced technical inadequacies, the present disclosure provides a power supply controller circuit for effectively saving power under an electrical specification. The power supply controller circuit includes a capacitor, a first switch component, a second switch component, a third switch component, a fourth switch component, a driver circuit, a detector circuit and a control circuit. A first terminal of the capacitor is connected to a first terminal of a power supply device and a first terminal of a load. A second terminal of the capacitor is connected to a second terminal of the load. A first terminal of the first switch component is connected to the second terminal of the capacitor. A second terminal of the first switch component is connected to a second terminal of the power supply device. A first terminal of the second switch component is connected to the second terminal of the capacitor. A second terminal of the second switch component is connected to the second terminal of the power supply device. A first terminal of the third switch component is connected to the first terminal of the power supply device. A first terminal of the fourth switch component is connected to a second terminal of the third switch component. A second terminal of the fourth switch component is connected to the second terminal of the power supply device. The driver circuit is connected to a control terminal of the fourth switch component. The detector circuit is connected to the second terminal of the capacitor. The control circuit is connected to a control terminal of the first switch component, a control terminal of the second switch component, a control terminal of the third switch component and the detector circuit. The driver circuit drives the fourth switch component, and the control circuit controls operations of the first switch component, the second switch component and the third switch component according to a voltage of the second terminal of the capacitor that is detected by the detector circuit, such that a current flowing back to the second terminal of the power supply device is not smaller than a current threshold specified in the electrical specification within specified time and power consumption of the power supply device is reduced.

As described above, the present disclosure provides the power supply controller circuit for effectively saving power under the electrical specification. The power supply controller circuit of the present disclosure is able to control the current flowing back to the power supply device to reach the current threshold specified in the electrical specification after the power supply device supplies the current. Under this condition, connection between the power supply device and the load is not determined to be removed and thus is not instructed to stop supplying the current. Therefore, an operational efficiency of the load, such as a power supplying efficiency that the load such as the power converter power supplies power to an electronic device, is not affected. As result, the power supply device operates normally and an operational efficiency of the power supply device is optimized under the condition that power consumption of the power supply device is reduced or minimized.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
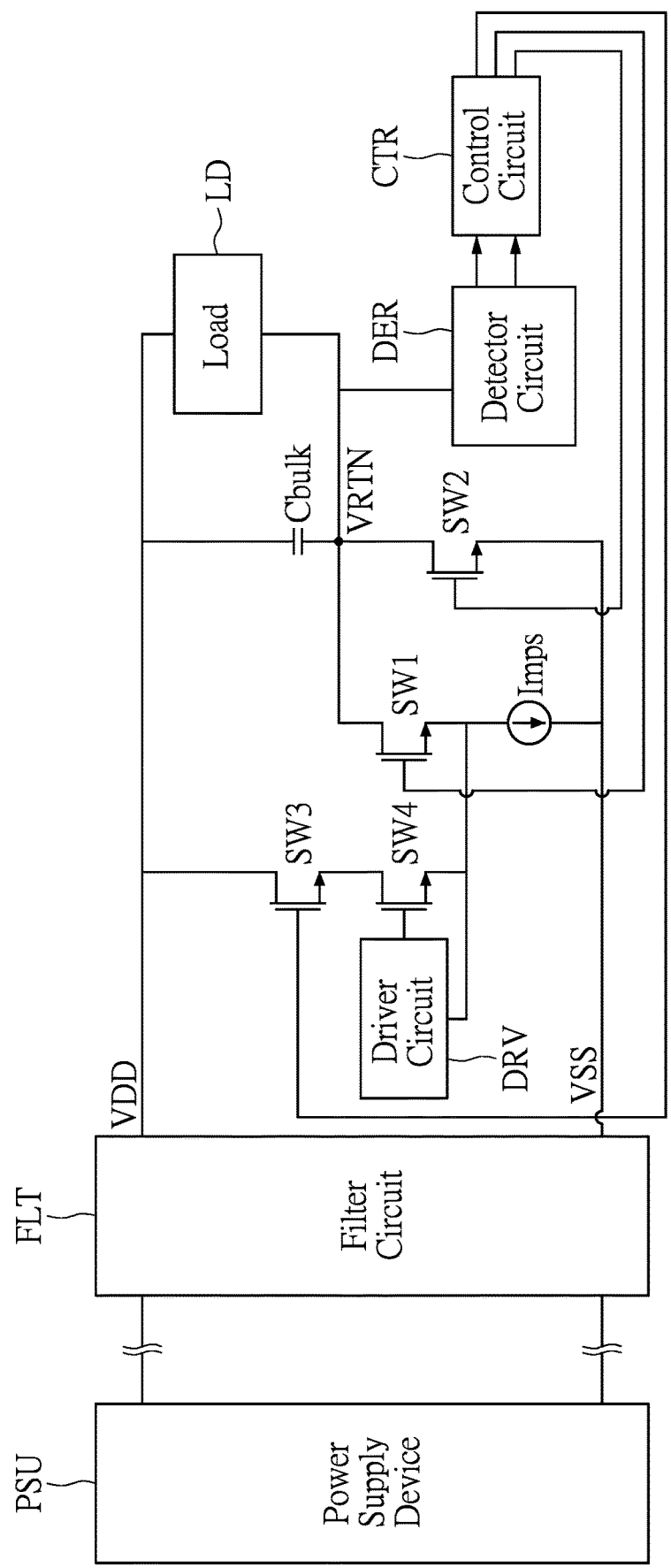
FIG. 1 is a circuit diagram of a power supply controller circuit for effectively saving power under an electrical specification according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 14:
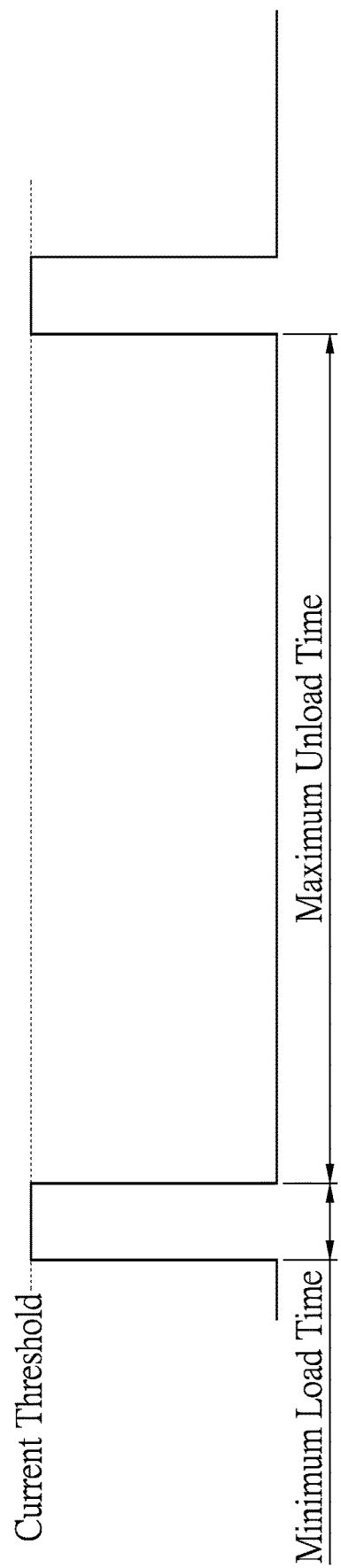
FIG. 14 is a schematic diagram illustrating changes in connection between the power supply controller circuit and a load over time according to the first and second embodiments of the present disclosure.

Reference is made to FIG. 1 and FIG. 14, in which FIG. 1 is a circuit diagram of a power supply controller circuit for effectively saving power under an electrical specification according to a first embodiment of the present disclosure, and FIG. 14 is a schematic diagram of changes in connection between the power supply controller circuit and a load over time according to the first and second embodiments of the present disclosure.

As shown in FIG. 1, the power supply controller circuit of the present disclosure includes a capacitor Cbulk, a first switch component SW1, a second switch component SW2, a third switch component SW3, a fourth switch component SW4, a control circuit CTR, a detector circuit DER and a driver circuit DRV.

The first switch component SW1, the second switch component SW2, the third switch component SW3 and the fourth switch component SW4 may be transistors, but the present disclosure is not limited thereto.

If necessary, in the first and second embodiments of the present disclosure, a filter circuit FLT may be disposed. The filter circuit FLT is connected to a first terminal VDD and a second terminal VSS of the power supply device PSU. The filter circuit FLT is connected between the power supply device PSU and the power supply controller circuit of the present disclosure.

A first terminal of the capacitor Cbulk is connected to the first terminal VDD (that is a positive terminal) of the power supply device PSU (through the filter circuit FLT). In addition, the first terminal of the capacitor Cbulk is connected to a first terminal of a load LD (such as a power converter or other powered devices). A second terminal of the capacitor Cbulk is connected to a second terminal of the load LD.

A first terminal of the first switch component SW1 is connected to the second terminal of the capacitor Cbulk. A second terminal of the first switch component SW1 is connected to the second terminal VSS (that is a negative terminal) of the power supply device PSU (through the filter circuit FLT).

A first terminal of the second switch component SW2 is connected to the second terminal of the capacitor Cbulk. A second terminal of the second switch component SW2 is connected to the second terminal VSS (that is the negative terminal) of the power supply device PSU (through the filter circuit FLT).

A first terminal of the third switch component SW3 is connected to the first terminal VDD (that is the positive terminal) of the power supply device PSU (through the filter circuit FLT). A second terminal of the third switch component SW3 is connected to a first terminal of the fourth switch component SW4.

A second terminal of the fourth switch component SW4 is connected to the second terminal VSS (that is the negative terminal) of the power supply device PSU (through the filter circuit FLT). The driver circuit DRV is connected to the second terminal of the first switch component SW1 and a control terminal of the fourth switch component SW4.

The detector circuit DER is connected to the second terminal of the capacitor Cbulk. The detector circuit DER may detect a voltage VRTN of the second terminal of the capacitor Cbulk.

The control circuit CTR is connected to a control terminal of the first switch component SW1, a control terminal of the second switch component SW2, a control terminal of the third switch component SW3 and the detector circuit DER.

It is worth noting that, the driver circuit DRV drives the fourth switch component SW4 (according to a voltage of the second terminal of the first switch component SW1). At the same time, the control circuit CTR controls operations of the first switch component SW1, the second switch component SW2 and the third switch component SW3, according to the voltage VRTN of the second terminal of the capacitor Cbulk that is detected by the detector circuit DER. Therefore, by the power supply controller circuit of the present disclosure, a current flowing back to the second terminal VSS (that is the negative terminal) of the power supply device PSU is controlled to be not smaller than the current threshold specified in the electrical specification within specified time (such as minimum load time as shown in FIG. 14).

For example, when the first terminal VDD (that is the positive terminal) of the power supply device PSU supplies a current, the control circuit CTR turns off the second switch component SW2 and turns on the first switch component SW1, and the control circuit CTR turns on the third switch component SW3 and the driver circuit DRV turns on the fourth switch component SW4. As a result, the current flowing back to the second terminal VSS (that is the negative terminal) of the power supply device PSU is not smaller than the current threshold within the specified time.

That is, after the power supply device PSU supplies the current, the power supply controller circuit of the present disclosure is able to control the current flowing back to the power supply device PSU to be not smaller than the current threshold within the specified time. Under this condition, the power supply device PSU is not determined to be unconnected to the load (such as the power converter or other powered devices) according to the current flowing back to the power supply device PSU, and thus the power supply device PSU is not instructed to stop supplying the current.

Figure 2:
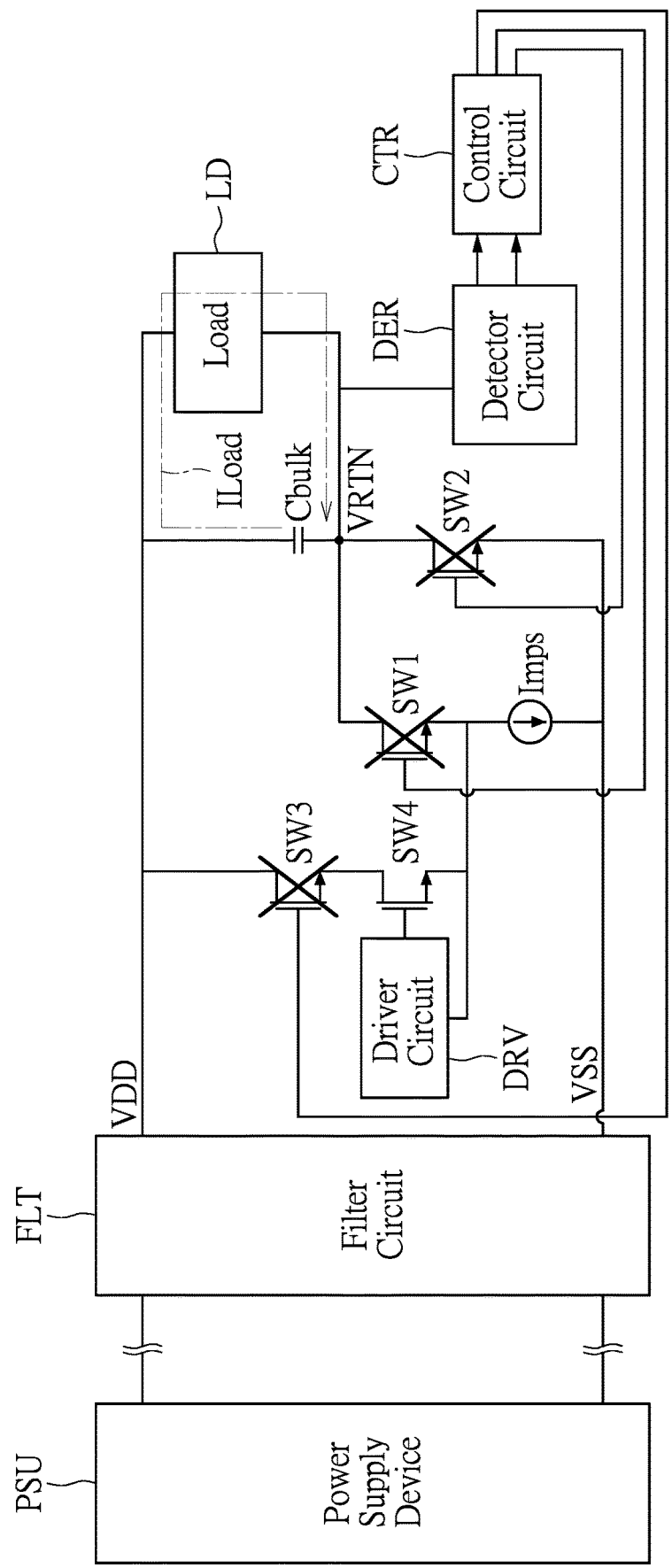
FIG. 2 is a circuit diagram of the power supply controller circuit in which a first switch component, a second switch component and a third switch component are turned off according to the first embodiment of the present disclosure.
Figure 3:
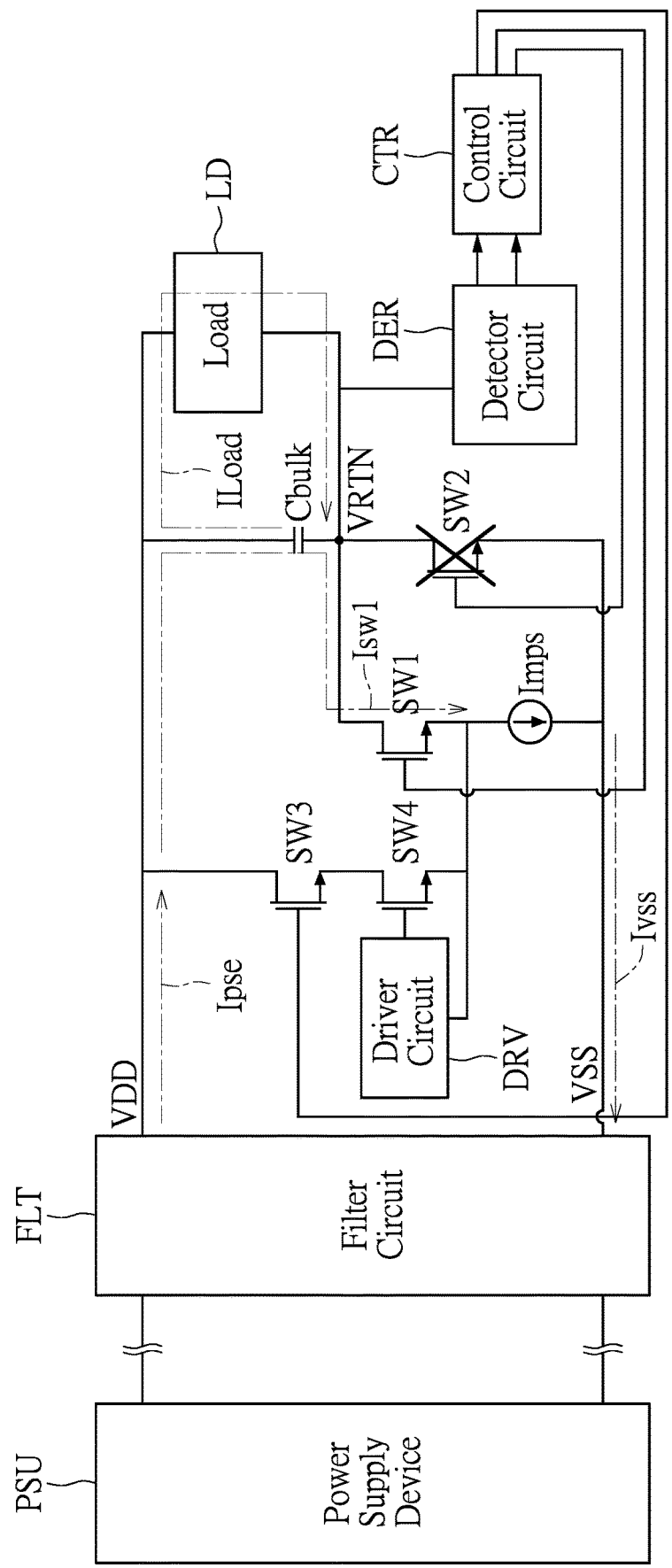
FIG. 3 is a schematic diagram of flowing directions of currents of the power supply controller circuit in which the first switch component is turned on according to the first embodiment of the present disclosure.
Figure 4:
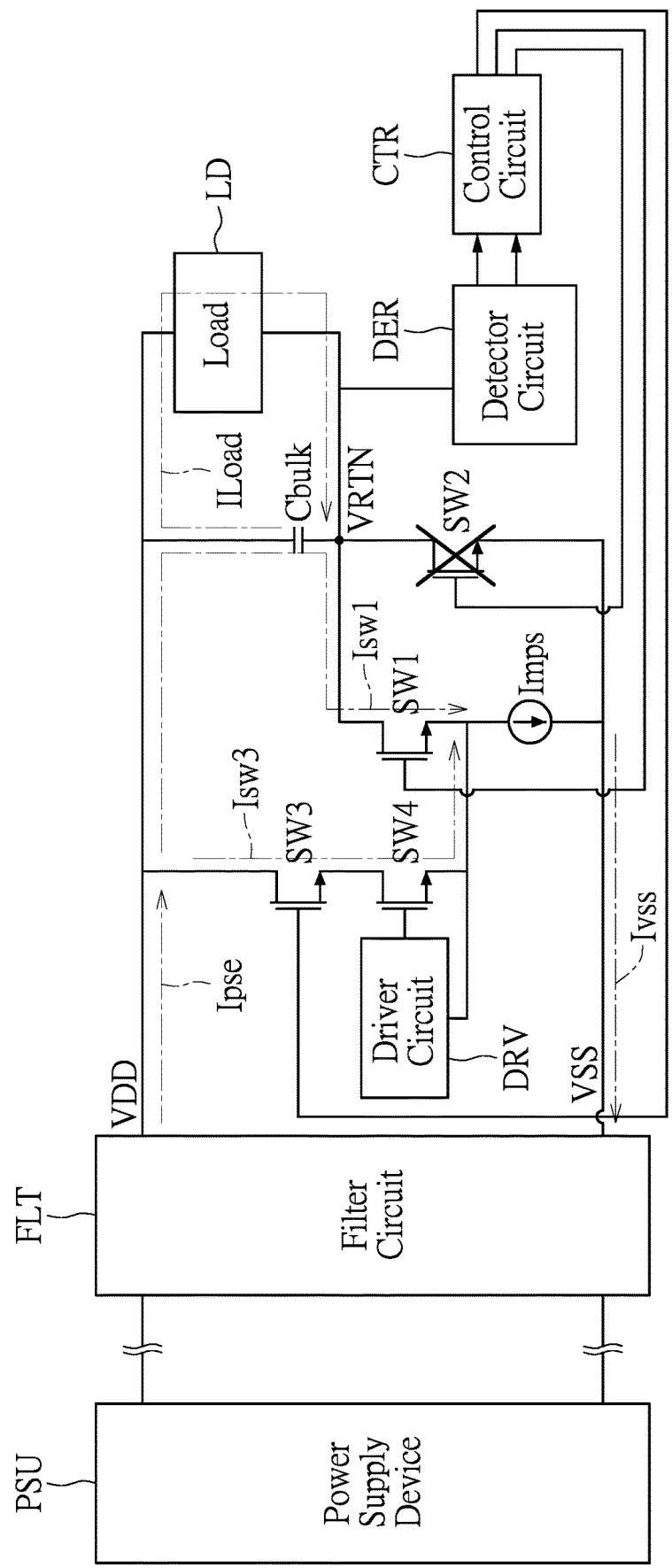
FIG. 4 is a schematic diagram of flowing directions of currents of the power supply controller circuit in which the first switch component, the third switch component and a fourth switch component are turned on according to the first embodiment of the present disclosure.

Reference is made to FIG. 1 to FIG. 4 and FIG. 8 to FIG. 11, in which FIG. 2 is a circuit diagram of the power supply controller circuit in which a first switch component, a second switch component and a third switch component are turned off according to the first embodiment of the present disclosure, FIG. 3 is a schematic diagram of flowing directions of currents of the power supply controller circuit in which the first switch component is turned on according to the first embodiment of the present disclosure, FIG. 4 is a schematic diagram of flowing directions of currents of the power supply controller circuit in which the first switch component, the third switch component and a fourth switch component are turned on according to the first embodiment of the present disclosure, and FIGS. 8 to 11 are waveform diagrams of signals of the power supply controller circuit according to the first and second embodiments of the present disclosure.

Figure 6:
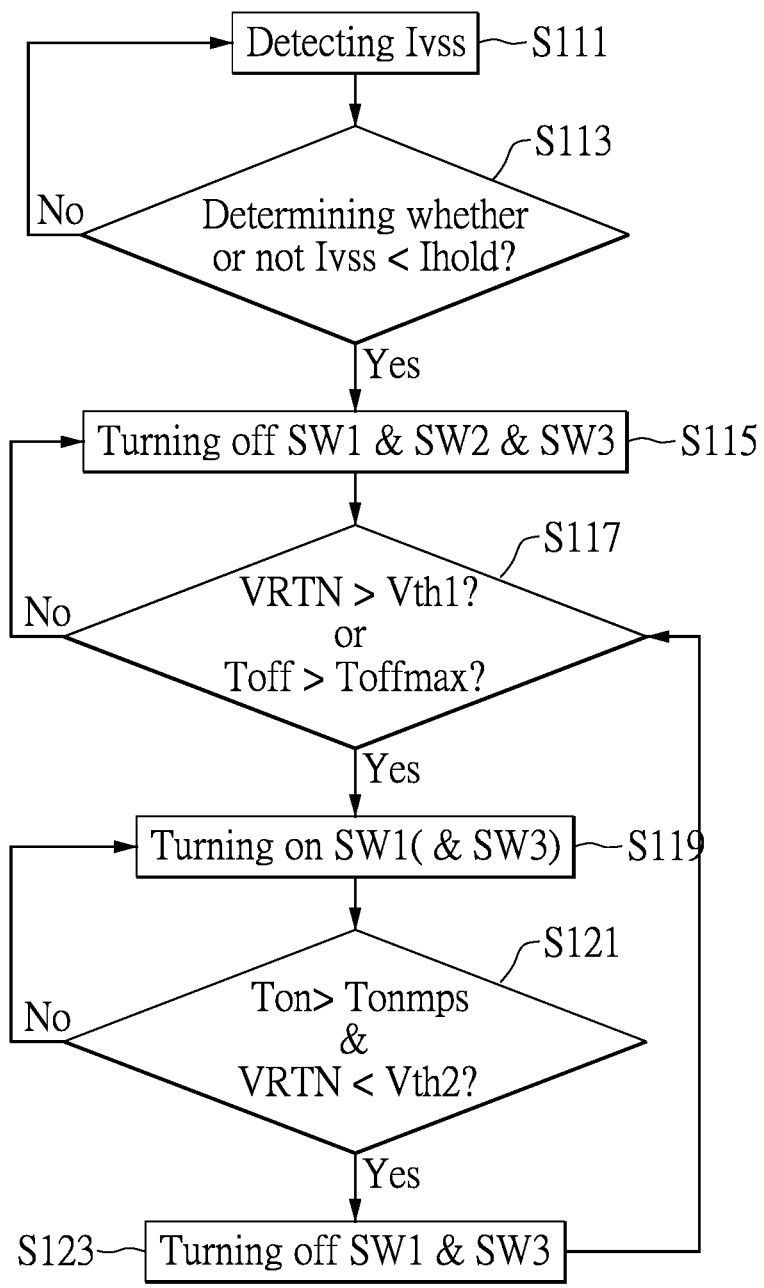
FIG. 6 is a flowchart diagram of steps performed by the power supply controller circuit according to the first embodiment of the present disclosure.

The power supply controller circuit of the present disclosure as shown in FIG. 1 may perform steps S111 to S121 as shown in FIG. 6.

First, when the first terminal VDD (that is the positive terminal) of the power supply device PSU supplies a current (such as a current Ipse as shown in FIG. 8 to FIG. 13), the detector circuit DER may detect current Ivss flowing back to the second terminal VSS (that is the negative terminal) of the power supply device PSU (in step S111 as shown in FIG. 6).

The control circuit CTR may, according to the detected current Ivss flowing back to the second terminal VSS (that is the negative terminal) of the power supply device PSU, control the operations of the first switch component SW1, the second switch component SW2 and the third switch component SW3.

The control circuit CTR may determine whether or not the detected current Ivss flowing back to the second terminal VSS (that is the negative terminal) of the power supply device PSU is smaller than a current threshold Ihold within the specified time (in step S113 as shown in FIG. 6).

If the control circuit CTR determines that the detected current Ivss flowing back to the second terminal VSS (that is the negative terminal) of the power supply device PSU is not smaller than the current threshold Ihold within the specified time, the control circuit CTR may control the detector circuit DER to continually detect the current Ivss flowing back to the second terminal VSS (that is the negative terminal) of the power supply device PSU (returning to step S111 as shown in FIG. 6).

Conversely, if the control circuit CTR determines that the detected current Ivss flowing back to the second terminal VSS (that is the negative terminal) of the power supply device PSU is smaller than the current threshold Ihold within the specified time, the control circuit CTR may turn off the first switch component SW1, the second switch component SW2 and the third switch component SW3 as shown in FIG. 2 (in step S115 as shown in FIG. 6).

When the first switch component SW1, the second switch component SW2 and the third switch component SW3 are turned off as shown in FIG. 2, the capacitor Cbulk starts to discharge to form a current ILoad flowing through the load LD. As a result, as shown in FIG. 8, the voltage VRTN of the second terminal of the capacitor Cbulk gradually increases.

Therefore, after the first switch component SW1, the second switch component SW2 and the third switch component SW3 are turned off for a period of time, the detector circuit DER detects the voltage VRTN of the second terminal of the capacitor Cbulk. Then, the control circuit CTR determines whether or not the voltage VRTN of the second terminal of the capacitor Cbulk is higher than a first threshold voltage Vth1 (in step S117 as shown in FIG. 6). In addition or alternatively, the control circuit CTR determines whether or not a time length of an off-time Toff of the first switch component SW1 (or the second switch component SW2) is larger than an off-time length threshold Toffmax (in step S117 as shown in FIG. 6).

Figure 8:
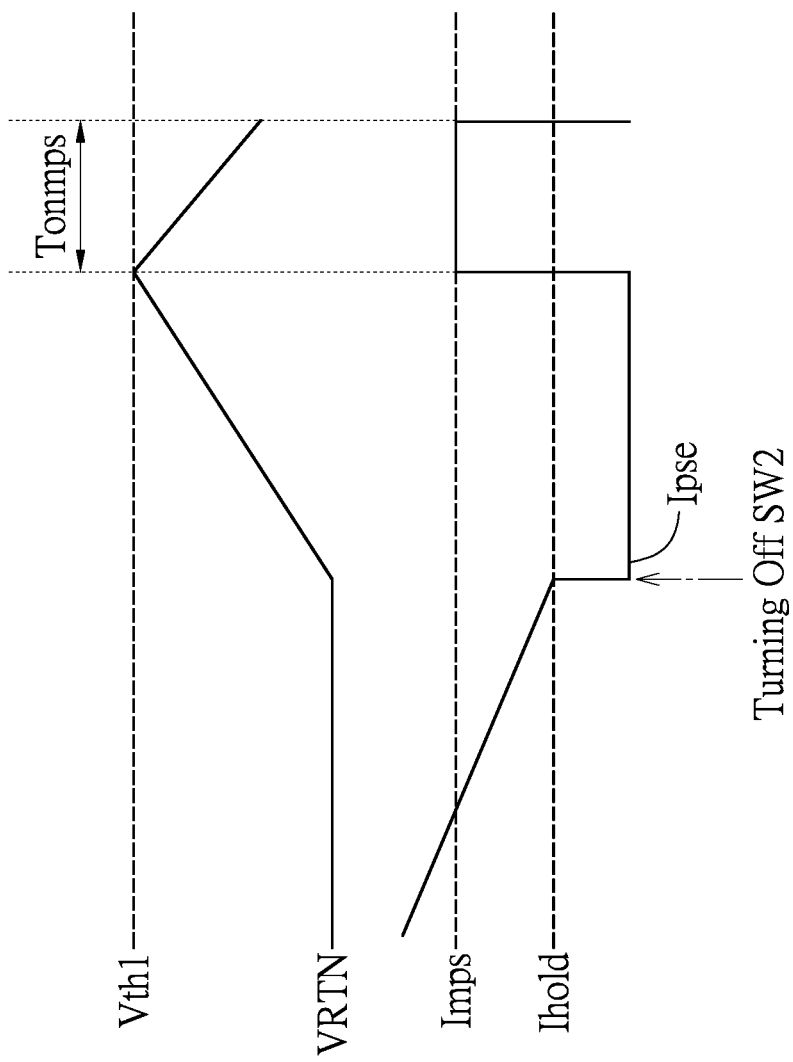
FIG. 8 is a waveform diagram of signals of the power supply controller circuit according to the first and second embodiments of the present disclosure.
Figure 9:
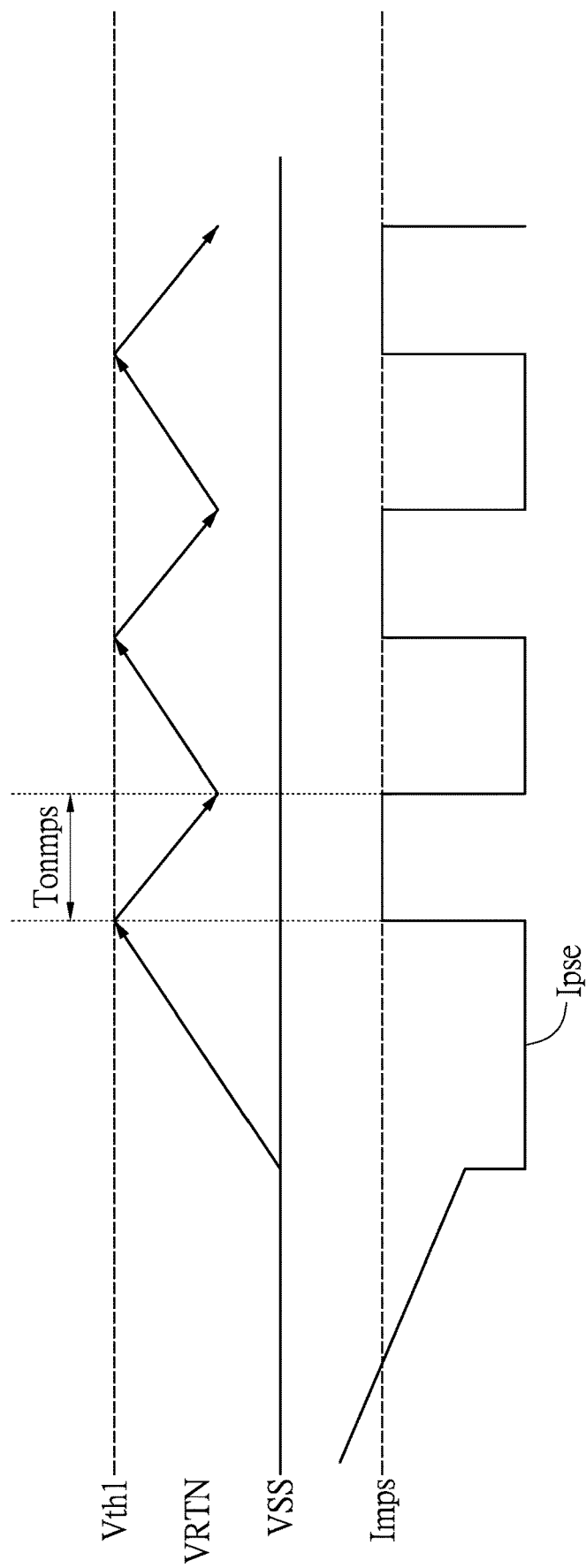
FIG. 9 is a waveform diagram of signals of the power supply controller circuit according to the first and second embodiments of the present disclosure.

If the voltage VRTN of the second terminal of the capacitor Cbulk is higher than the first threshold voltage Vth1 as shown in FIG. 8 and FIG. 9 or the time length of the off-time Toff of the first switch component SW1 (or the second switch component SW2) is larger than the off-time length threshold Toffmax after the first switch component SW1, the second switch component SW2 and the third switch component SW3 are turned off, the control circuit CTR may turn on the first switch component SW1 as shown in FIG. 3 or turn on both of the first switch component SW1 and the third switch component SW3 as shown in FIG. 4 (in step S119 as shown in FIG. 6). At the same time, the control circuit CTR may turn off the second switch component SW2 as shown in FIG. 3 and FIG. 4.

Figure 10:
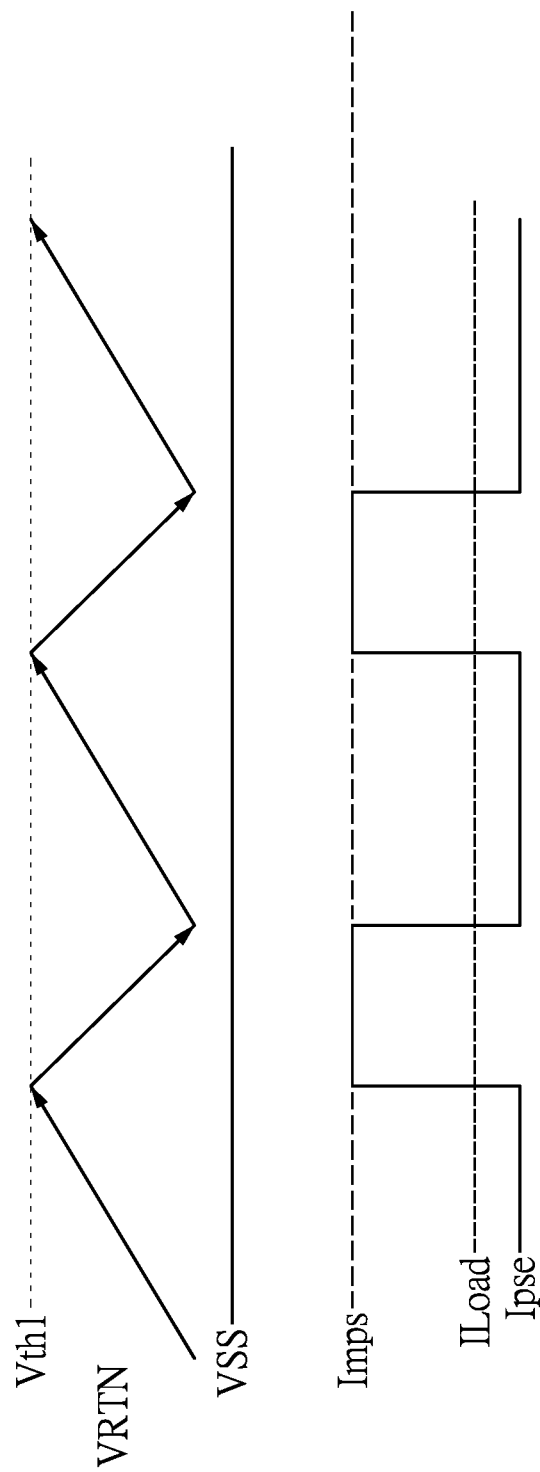
FIG. 10 is a waveform diagram of signals of the power supply controller circuit according to the first and second embodiments of the present disclosure.
Figure 11:
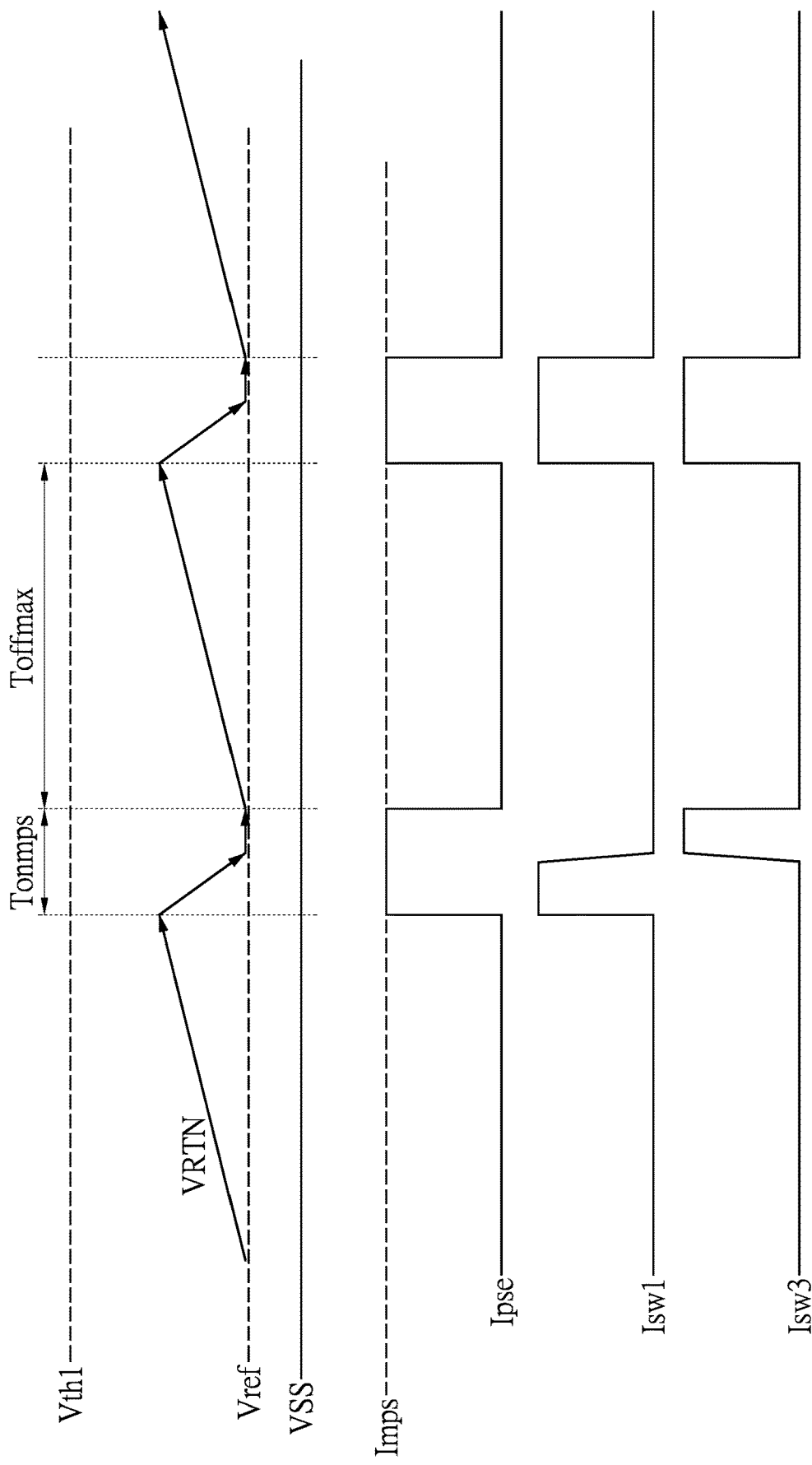
FIG. 11 is a waveform diagram of signals of the power supply controller circuit according to the first and second embodiments of the present disclosure.

If the load LD is a light load or is removed, the load LD only obtains the small current ILoad from the power supply device PSU as shown in FIG. 10. Under this condition, the current Ivss received by the second terminal VSS (that is the negative terminal) of the power supply device PSU may be smaller than the current threshold Ihold. When the current Ivss received by the second terminal VSS (that is the negative terminal) of the power supply device PSU is smaller than the current threshold Ihold, the control circuit CTR turns on the first switch component SW1 such that a current Isw1 flows through the first switch component SW1. At the same time, the control circuit CTR may turn on the third switch component SW3 and the driver circuit DRV may turn on the fourth switch component SW4 such that a current Isw3 flows through the third switch component SW3 and the fourth switch component SW4 to the second terminal VSS (that is the negative terminal) of the power supply device PSU.

For example, the driver circuit DRV may detect the voltage of the second terminal of the first switch component SW1 to determine whether to turn on the fourth switch component SW4. When the detected voltage of the second terminal of the first switch component SW1 is lower than a reference voltage Vref, the driver circuit DRV may turn on the fourth switch component SW4. As shown in FIG. 4, the first switch component SW1, the third switch component SW3 and the fourth switch component SW4 are turned on at the same time. At this time, a current Imps flowing back to the second terminal VSS (that is the negative terminal) of the power supply device PSU is a sum of the current Isw1 that flows sequentially through the capacitor Cbulk and the first switch component SW1 and the current Isw3 that sequentially flows through the third switch component SW3 and the fourth switch component SW4.

After the first switch component SW1 is turned on, the current Isw1 flows sequentially through the capacitor Cbulk and the first switch component SW1 to the second terminal VSS (that is the negative terminal) of the power supply device PSU. As a result, as shown in FIG. 9, the voltage VRTN of the second terminal of the capacitor Cbulk is gradually reduced.

After the first switch component SW1 and the third switch component SW3 are turned on, the control circuit CTR may time a time length during which the first switch component SW1 is turned on (and the third switch component SW3 is turned on), and the detector circuit DER may detect the voltage VRTN of the second terminal of the capacitor Cbulk.

The control circuit CTR may determine whether or not the time length (that is represented by "Ton" in FIG. 6) during which the first switch component SW1 is turned on (and the third switch component SW3 is turned on) is larger than an on-time threshold Tonmps (in step S121 as shown in FIG. 6). In addition or alternatively, the control circuit CTR may determine whether or not the voltage VRTN of the second terminal of the capacitor Cbulk is lower than a second threshold voltage Vth2 after the first switch component SW1 is turned on (and the third switch component SW3 is turned on) (in step S121 as shown in FIG. 6).

If the time length (that is represented by "Ton" in FIG. 6) during which the first switch component SW1 is turned on (and the third switch component SW3 is turned on, and the voltage VRTN of the second terminal of the capacitor Cbulk is lower than the second threshold voltage Vth2 after the first switch component SW1 is turned on), the control circuit CTR turns off the first switch component SW1 and the third switch component SW3 (in step S123 as shown in FIG. 6).

Figure 7:
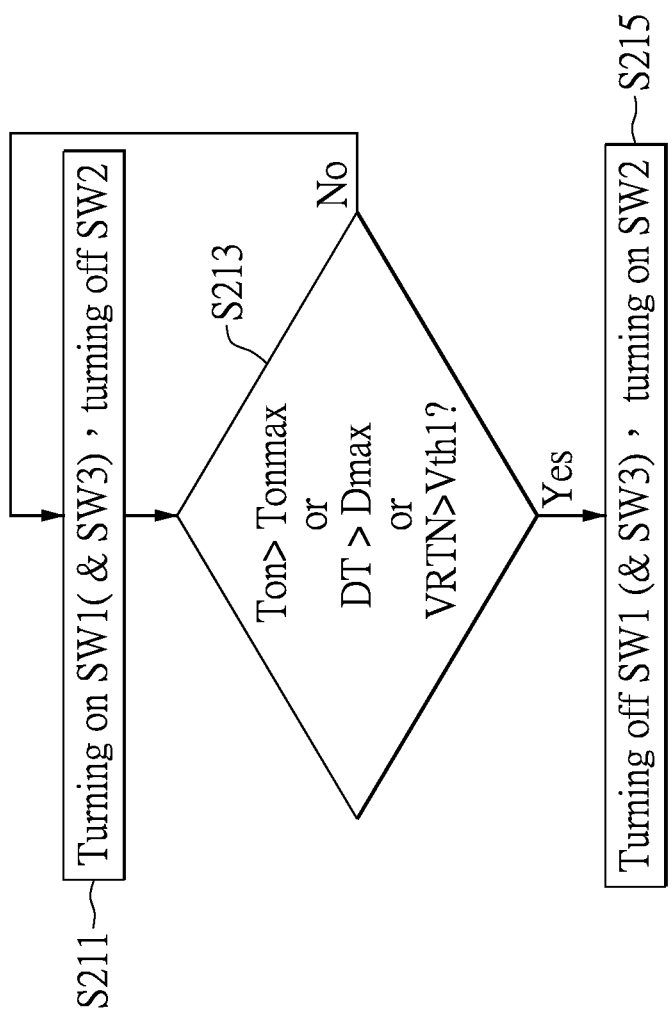
FIG. 7 is a flowchart diagram of steps performed by the power supply controller circuit being applied to a heavy load according to the first embodiment of the present disclosure.
Figure 12:
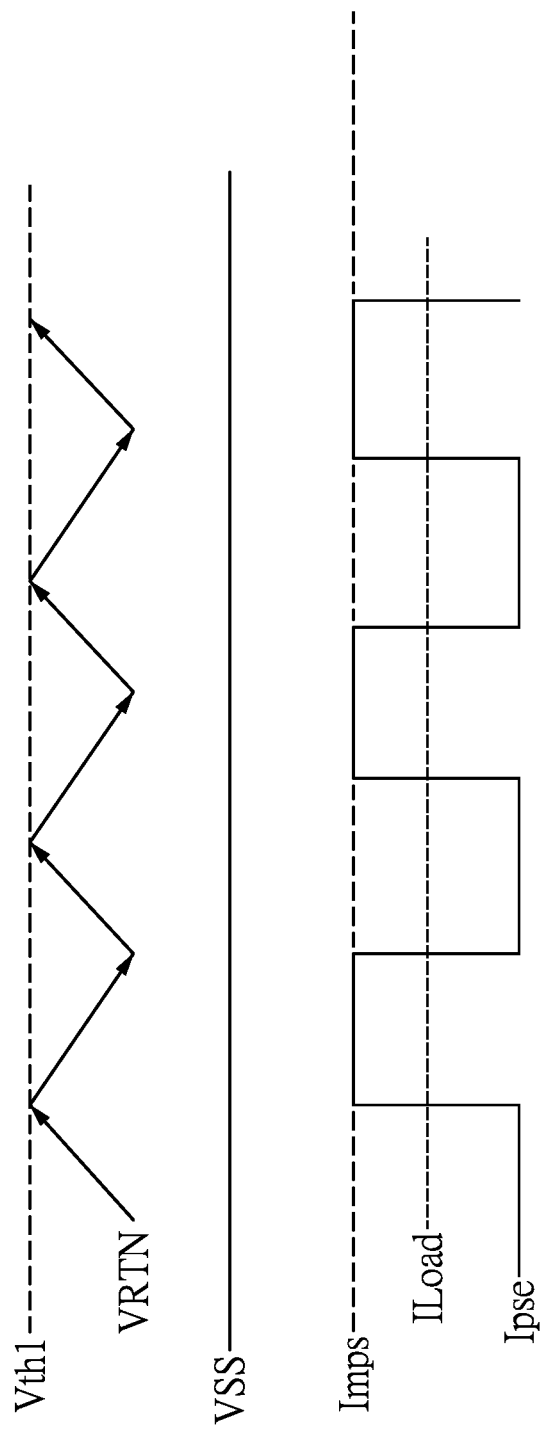
FIG. 12 is a waveform diagram of signals of the power supply controller circuit according to the first and second embodiments of the present disclosure.
Figure 13:
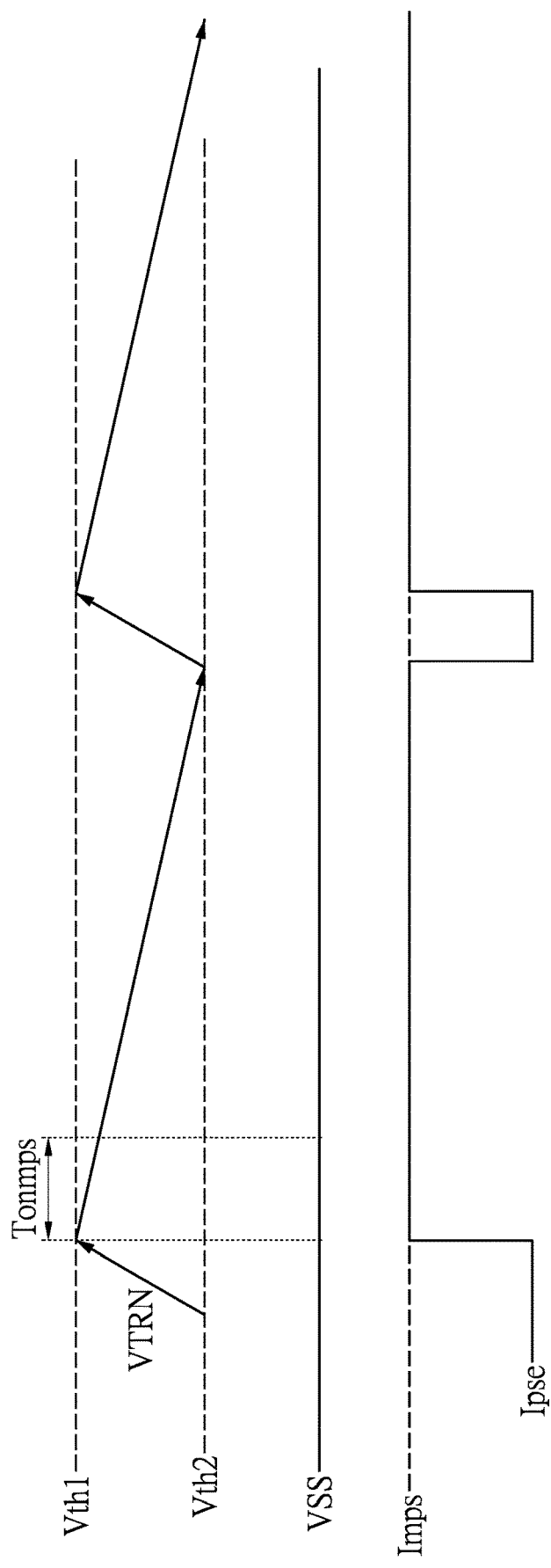
FIG. 13 is a waveform diagram of signals of the power supply controller circuit according to the first and second embodiments of the present disclosure.

Reference is made to FIG. 1, FIG. 7, FIG. 12 and FIG. 13, in which FIG. 7 is a flowchart diagram of steps performed by the power supply controller circuit being applied to a heavy load according to the first embodiment of the present disclosure, FIG. 12 is a waveform diagram of signals of the power supply controller circuit according to the first and second embodiments of the present disclosure, and FIG. 13 is a waveform diagram of signals of the power supply controller circuit according to the first and second embodiments of the present disclosure.

The power supply controller circuit of the present disclosure may perform steps S211 to S215 as shown in FIG. 7 on the load LD being a heavy load that obtains the large current ILoad as shown in FIG. 12 from the power supply controller circuit of the present disclosure.

When the first terminal VDD (that is the positive terminal) of the power supply device PSU supplies the current Ipse, the control circuit CTR may turn on the first switch component SW1 (and the third switch component SW3) (in step S211 as shown in FIG. 7).

The control circuit CTR may determine whether or not the time length (that is represented by "Ton" in FIG. 6) during which the first switch component SW1 is turned on (and the third switch component SW3 is turned on) is larger than a maximum on-time Tonmax (in step S213 as shown in FIG. 7).

In addition or alternatively, the control circuit CTR may determine whether or not a duty cycle DT of a current signal outputted by the first terminal VDD (that is the positive terminal) of the power supply device PSU is larger than a duty cycle threshold Dmax (in step S213 as shown in FIG. 7).

In addition or alternatively, the control circuit CTR may determine whether or not the voltage VRTN of the second terminal of the capacitor Cbulk detected by the detector circuit DER is higher than the first threshold voltage Vth1 (in step S213 as shown in FIG. 7).

When the time length (that is represented by "Ton" in FIG. 6) during which the first switch component SW1 is turned on (and the third switch component SW3 is turned on) is larger than the maximum on-time Tonmax, the duty cycle DT of the current signal outputted by the first terminal VDD (that is the positive terminal) of the power supply device PSU is larger than the duty cycle threshold Dmax or the voltage VRTN of the second terminal of the capacitor Cbulk detected by the detector circuit DER is higher than the first threshold voltage Vth1, the control circuit CTR determines that the current ILoad flowing through the load LD is large (larger than the current threshold). At this time, the power supply controller circuit of the present disclosure may be switched to a normal mode. In the normal mode, the control circuit CTR turns off the first switch component SW1 (and the third switch component SW3) and turns off the second switch component SW2 (in step S215 as shown in FIG. 7).

Conversely, when the time length (that is represented by "Ton" in FIG. 6) during which the first switch component SW1 is turned on (and the third switch component SW3 is turned on) is not larger than the maximum on-time Tonmax, the duty cycle DT of the current signal outputted by the first terminal VDD (that is the positive terminal) of the power supply device PSU is not larger than the duty cycle threshold Dmax or the voltage VRTN of the second terminal of the capacitor Cbulk detected by the detector circuit DER is not higher than the first threshold voltage Vth1, the control circuit CTR determines that the current ILoad flowing through the load LD is smaller than the current threshold. At this time, the power supply controller circuit of the present disclosure is maintained in a light load control mode.

Figure 5:
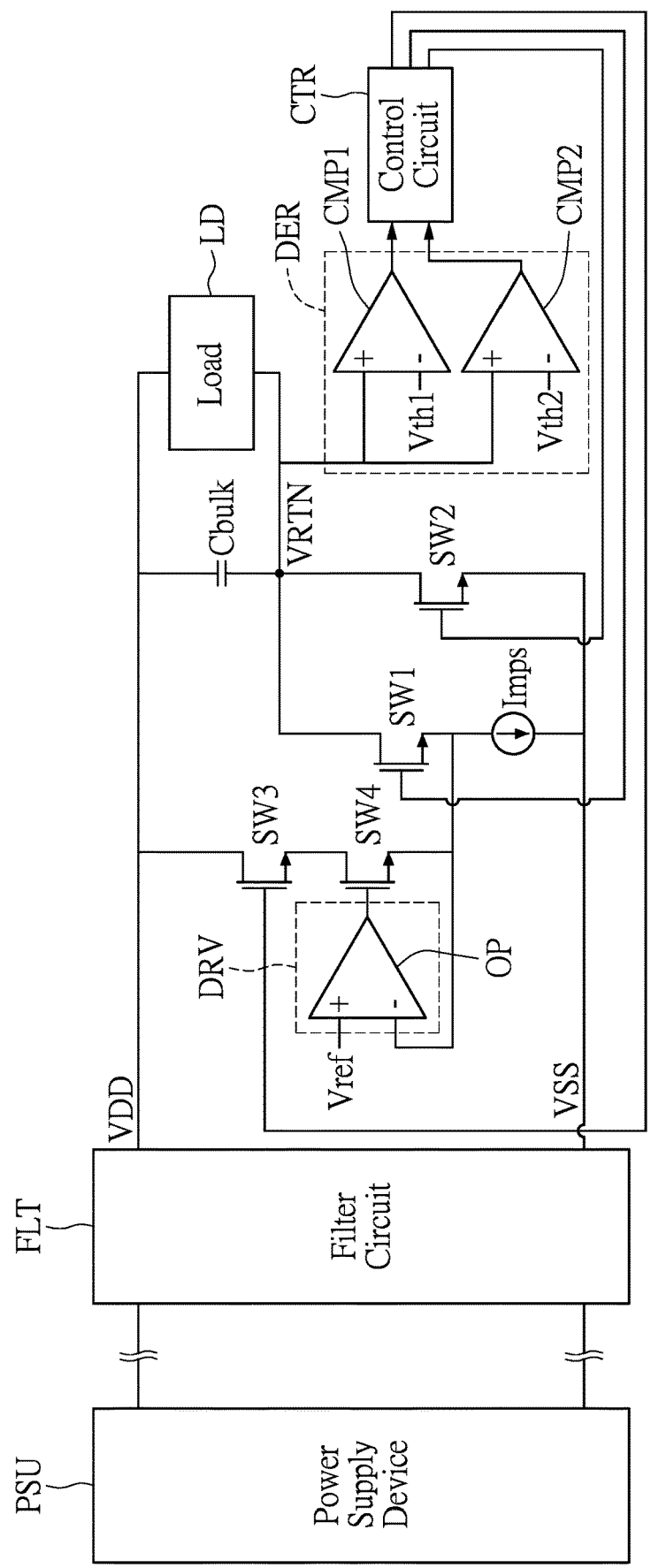
FIG. 5 is a circuit diagram of a power supply controller circuit for effectively saving power under an electrical specification according to a second embodiment of the present disclosure.

Reference is made to FIG. 5, which is a circuit diagram of a power supply controller circuit for effectively saving power under an electrical specification according to a second embodiment of the present disclosure.

The descriptions of the second embodiment of the present disclosure that are the same as that of the first embodiment of the present disclosure are not repeated herein.

In second embodiment of the present disclosure, the driver circuit DRV includes an operational amplifier OP, and the detector circuit DER includes a first comparator CMP1 and a second comparator CMP2.

A first input terminal such as a non-inverting input terminal of the operational amplifier OP is coupled to the reference voltage Vref. A second input terminal such as an inverting input terminal of the operational amplifier OP is connected to the second terminal of the first switch component SW1. An output terminal of the operational amplifier OP is connected to the control terminal of the fourth switch component SW4.

A first input terminal such as a non-inverting input terminal of the first comparator CMP1 is connected to the second terminal of the capacitor Cbulk. A second input terminal such as an inverting input terminal of the first comparator CMP1 is coupled to the first threshold voltage Vth1. An output terminal of the first comparator CMP1 is connected to the control circuit CTR.

A first input terminal such as a non-inverting input terminal of the second comparator CMP2 is connected to the second terminal of the capacitor Cbulk. A second input terminal such as an inverting input terminal of the second comparator CMP2 is coupled to the second threshold voltage Vth2. An output terminal of the second comparator CMP2 is connected to the control circuit CTR.

When the control circuit CTR determines that the voltage VRTN of the second terminal of the capacitor Cbulk is higher than the first threshold voltage Vth1 according to (a level of) a first comprising signal from the first comparator CMP1, the control circuit CTR turns on the first switch component SW1 (and the third switch component SW3) and turns off the second switch component SW2.

After the first switch component SW1 is turned on (and the third switch component SW3 is turned on), the control circuit CTR determines whether or not the voltage VRTN of the second terminal of the capacitor Cbulk is lower than the second threshold voltage Vth2 according to a second comprising signal from the second comparator CMP2.

When the control circuit CTR determines that the voltage VRTN of the second terminal of the capacitor Cbulk is lower than the second threshold voltage Vth2 according to the comprising signal from the second comparator CMP2, the control circuit CTR turns off the first switch component SW1 (and the third switch component SW3). At this time, the second switch component SW2 may be turned off continually.

In conclusion, the present disclosure provides the power supply controller circuit for effectively saving power under the electrical specification. The power supply controller circuit of the present disclosure is able to control the current flowing back to the power supply device to reach the current threshold specified in the electrical specification after the power supply device supplies the current. Under this condition, the power supply device is not determined to be unconnected to the load and thus is not instructed to stop supplying the current. Therefore, an operational efficiency of the load, such as a power supplying efficiency that the load such as the power converter power supplies power to an electronic device, is not affected. As result, the power supply device operates normally and an operational efficiency of the power supply device is optimized under the condition that power consumption of the power supply device is reduced or minimized.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power supply controller circuit for effectively saving power under an electrical specification, comprising:
   a capacitor, wherein a first terminal of the capacitor is connected to a first terminal of a power supply device and a first terminal of a load, and a second terminal of the capacitor is connected to a second terminal of the load;
   a first switch component, wherein a first terminal of the first switch component is connected to the second terminal of the capacitor, and a second terminal of the first switch component is connected to a second terminal of the power supply device;
   a second switch component, wherein a first terminal of the second switch component is connected to the second terminal of the capacitor, and a second terminal of the second switch component is connected to the second terminal of the power supply device;
   a third switch component, wherein a first terminal of the third switch component is connected to the first terminal of the power supply device;
   a fourth switch component, wherein a first terminal of the fourth switch component is connected to a second terminal of the third switch component, and a second terminal of the fourth switch component is connected to the second terminal of the power supply device;
   a driver circuit connected to a control terminal of the fourth switch component;
   a detector circuit connected to the second terminal of the capacitor; and
   a control circuit connected to a control terminal of the first switch component, a control terminal of the second switch component, a control terminal of the third switch component and the detector circuit;
   wherein the driver circuit drives the fourth switch component, and the control circuit controls operations of the first switch component, the second switch component and the third switch component according to a voltage of the second terminal of the capacitor that is detected by the detector circuit, such that a current flowing back to the second terminal of the power supply device is not smaller than a current threshold specified in the electrical specification within specified time and power consumption of the power supply device is reduced.

2. The power supply controller circuit according to claim 1, wherein the load includes a power converter.

3. The power supply controller circuit according to claim 1, wherein the control circuit turns on the first switch component and turns off the second switch component such that a current that sequentially flows through the capacitor and the first switch component to the second terminal of the power supply device is not smaller than the current threshold within the specified time.

4. The power supply controller circuit according to claim 1, wherein the detector circuit detects the voltage of the second terminal of the capacitor and the current flowing back to the second terminal of the power supply device, and accordingly the control circuit controls the operations of the first switch component, the second switch component and the third switch component.

5. The power supply controller circuit according to claim 1, wherein, when the control circuit determines that the current flowing back to the second terminal of the power supply device is smaller than the current threshold within the specified time, the control circuit turns off the first switch component, the second switch component and the third switch component, and the detector circuit detects the voltage of the second terminal of the capacitor.

6. The power supply controller circuit according to claim 5, wherein, after the first switch component, the second switch component and the third switch component are turned off for a period of time, the control circuit determines whether the voltage of the second terminal of the capacitor is higher than a threshold voltage;
wherein, when the voltage of the second terminal of the capacitor is higher than the threshold voltage, the control circuit continually turns off the second switch component, and the control circuit turns on the first switch component or turns on both of the first switch component and the third switch component.

7. The power supply controller circuit according to claim 5, wherein, when a time length during which the first switch component is turned off is larger than an off-time length threshold, the control circuit turns on the first switch component or turns on both of the first switch component and the third switch component.

8. The power supply controller circuit according to claim 1, wherein, when the control circuit turns off the second switch component, the control circuit turns on the first switch component.

9. The power supply controller circuit according to claim 1, wherein, when a time length during which the first switch component and the third switch component are turned on by the control circuit is larger than a maximum on-time, the control circuit turns off the first switch component and the third switch component.

10. The power supply controller circuit according to claim 1, wherein, when the voltage of the second terminal of the capacitor detected by the detector circuit is lower than a threshold voltage, the control circuit turns off the first switch component and the third switch component.

11. The power supply controller circuit according to claim 1, wherein, when a time length during which the first switch component and the third switch component are turned on by the control circuit is larger than a maximum on-time and the voltage of the second terminal of the capacitor is lower than a threshold voltage, the control circuit turns off the first switch component and the third switch component.

12. The power supply controller circuit according to claim 1, wherein, when the control circuit turns off the second switch component, the control circuit turns on the first switch component and the third switch component, and the driver circuit turns on the fourth switch component.

13. The power supply controller circuit according to claim 1, wherein the driver circuit is connected to the second terminal of the first switch component, and configured to drive the fourth switch component according to a voltage of the second terminal of the first switch component.

14. The power supply controller circuit according to claim 13, wherein, when the driver circuit determines that the voltage of the second terminal of the first switch component is lower than a reference voltage, the driver circuit turns on the fourth switch component.

15. The power supply controller circuit according to claim 1, wherein, when the load is a light load or is removed, the control circuit turns off the second switch component and turns on the first switch component and the third switch component, and the driver circuit turns on the fourth switch component;
wherein, when the load is a heavy load, the control circuit turns on the second switch component and turns off the first switch component and the third switch component, and the driver circuit turns off the fourth switch component.

16. The power supply controller circuit according to claim 1, wherein, when a duty cycle of a current signal outputted by the first terminal of the power supply device is larger than a duty threshold, and a time length during which the first switch component and the third switch component are turned on is larger than a maximum on-time or the voltage of the second terminal of the capacitor is higher than a threshold voltage, the control circuit turns on the second switch component and turns off the first switch component and the third switch component and the driver circuit turns off the fourth switch component.

17. The power supply controller circuit according to claim 1, wherein the driver circuit includes:
an operational amplifier, wherein a first input terminal of the operational amplifier is coupled to a reference voltage, a second input terminal of the operational amplifier is connected to the second terminal of the first switch component, and an output terminal of the operational amplifier is connected to the control terminal of the fourth switch component.

18. The power supply controller circuit according to claim 1, wherein the detector circuit includes:
a first comparator, wherein a first input terminal of the first comparator is connected to the second terminal of the capacitor, a second input terminal of the first comparator is coupled to a first threshold voltage, and an output terminal of the first comparator is connected to the control circuit.

19. The power supply controller circuit according to claim 18, wherein the detector circuit further includes:
a second comparator, wherein a first input terminal of the second comparator is connected to the second terminal of the capacitor, a second input terminal of the second comparator is coupled to a second threshold voltage, and an output terminal of the second comparator is connected to the control circuit.

* * * * *